JAMES B. DRAKE.
Improvement in Hay Carriers.
No. 125,183.  Patented April 2, 1872.
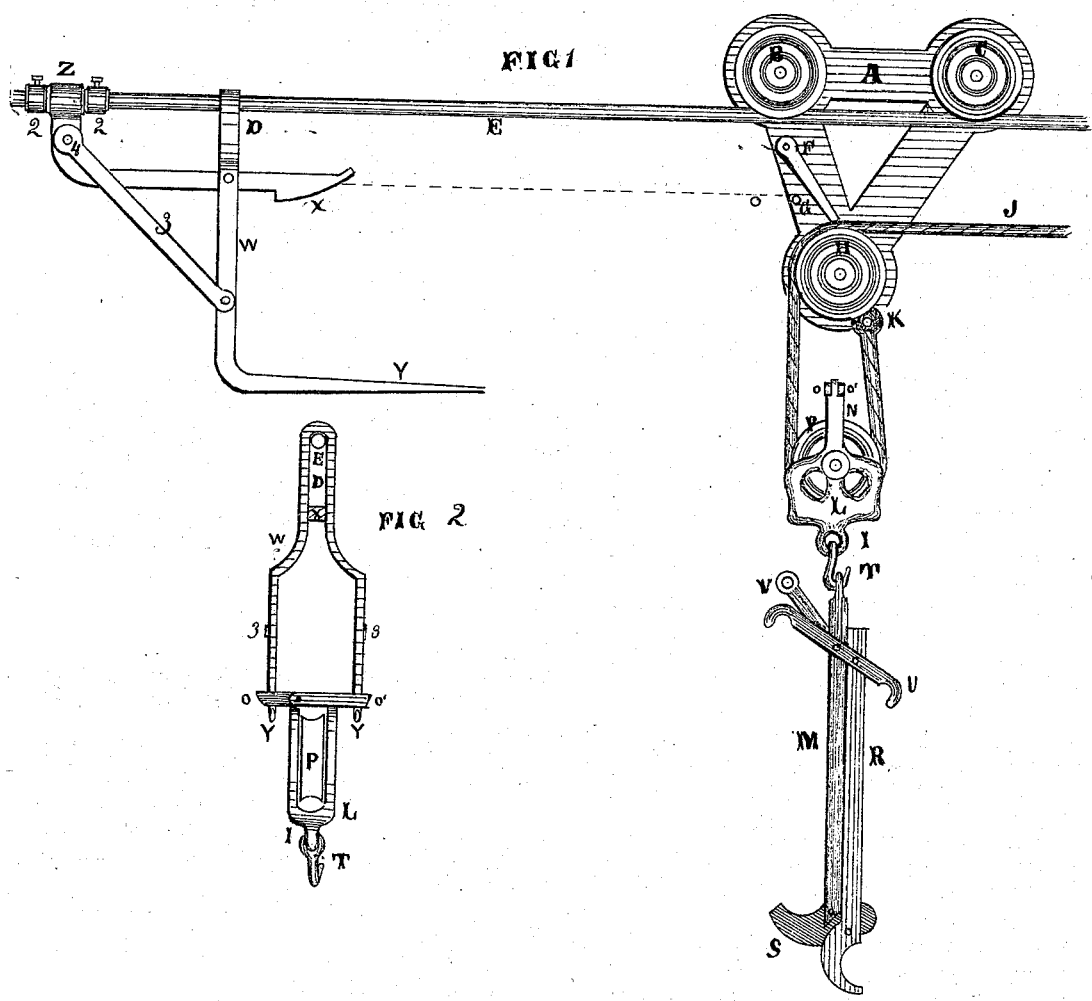
WITNESSES:
INVENTOR
J. B. Drake

UNITED STATES PATENT OFFICE.

JAMES B. DRAKE, OF INDIANAPOLIS, INDIANA.

IMPROVEMENT IN HAY-CARRIERS.

Specification forming part of Letters Patent No. 125,183, dated April 2, 1872.

Specification describing certain Improvements in Portable Hay-Carriers, invented by JAMES B. DRAKE, of Indianapolis, county of Marion and State of Indiana.

My invention consists in the peculiar arrangement of a carrier-rod, sheaves, adjustable hook or trip, and pawls, in such a manner that hay or straw can be elevated from the load or stack and conveyed to any point within the length of the carrier-rod.

Figure 1 represents the hay-carrier complete, showing the adjustable hook or trip at one end of the rod and the carrier at the other end. Fig. 2 is an end view of the same, showing the trip as it engages with the hook A.

A represents one side of the frame of the carrier. B, C, and H are sheaves attached to the frames A. E is the carrier-rod, that can be of any length that is suitable. F is a pawl that holds the rope from slipping. G is a stop-pin that will not allow the pawl F to fall below the sheave H, and also forms a catch for the hook X of the trip to catch and hold the carrier from slipping on the rod until the trip is raised. J is the hoisting-rope that is made fast to the pin K, and passes around the sheave P and H, and extends to the power that is applied for hoisting. L is the block that the sheave P works in, and is provided with a projection, N, on the upper side, on which are attached two trips, O O'. On the lower side is a ring, I, in which is a hook, T, for the purpose of attaching to the harpoon M R. W Y represent the trip-hook, and is suspended on the rod E. The end Z of the hook is hinged at 4, so that the end of the fork Y Y can raise as the inclined hook A comes in contact with the pin G. D is the loop that passes over the rod E, and allows the hook to raise free on the rod E. 2 2 are set-collars, placed on the rod E, on each side of the hinge-joint Z 4, to hold the hook from slipping.

The operation of my improvement is as follows: The carrier A is drawn over the rod E until the hook X is hooked over the pin G, and the end of the hook X lifts the pawl F and allows the rope J to run free, and the harpoon drops into a load of hay; then the harpoon is raised by means of the rope J, and, as the trips O O' on the block L come in contact with the hooks Y Y', as shown in Fig. 2, the trips lift the hooks Y Y, and these lift the hook X from the pin G. This allows the carrier to move forward, and the pawl F falls against the rope J and holds it from slipping until it is again brought in contact with the hook X. The load on the harpoon is conveyed to any desired point, and is then tripped from the harpoon by means of a rope attached to V of the harpoon. After it is tripped the carrier is again drawn back to the hook Z W D Y, when the same operation can be repeated.

Claim.

I claim—

1. The pin G, in combination with the carrier A B C H and the hook X, substantially as or for the purpose set forth.

2. The trips O O', in combination with the sheave-block L and hooks Y Y, substantially as or for the purpose hereinbefore set forth.

In testimony whereof I have signed my name to this specification in the presence of two subscribing witnesses.

JAMES B. DRAKE.

Witnesses:
S. C. FRINK,
E. O. FRINK.